United States Patent [19]

Loeffler

[11] Patent Number: 4,798,276
[45] Date of Patent: Jan. 17, 1989

[54] SHAPING TURRET

[75] Inventor: Earl F. Loeffler, Uniontown, Ohio

[73] Assignee: The Firestone Tire & Rubber Company, Akron, Ohio

[21] Appl. No.: 458,680

[22] Filed: Jan. 17, 1983

[51] Int. Cl.⁴ .............................................. B65G 17/32
[52] U.S. Cl. ...................................... 198/378; 156/396
[58] Field of Search .............. 198/378, 478, 344, 689; 156/396, 111; 425/38, 150, 361; 137/594

[56] References Cited

U.S. PATENT DOCUMENTS

| | | | |
|---|---|---|---|
| 2,071,716 | 2/1937 | Wikle | 156/396 |
| 3,223,573 | 12/1965 | Deist | 156/111 X |
| 3,589,498 | 6/1971 | Cowan et al. | 198/365 X |
| 3,740,292 | 6/1973 | Leblond | 156/396 |
| 3,909,337 | 9/1975 | Yabe | 156/396 X |
| 4,155,439 | 5/1979 | Fletcher et al. | 198/689 X |
| 4,304,619 | 12/1981 | Riggs | 156/396 X |

Primary Examiner—Robert J. Spar
Assistant Examiner—Cheryl L. Gastineau
Attorney, Agent, or Firm—Ronald Brietkrenz

[57] ABSTRACT

An apparatus for transmitting logic information from two members which move relative to one another by use of fluid logic signals. A shaping turret employing an upper structure carrying a plurality of bladderless shaping drums or flanges which ae driven and controlled by apparatus requiring only one rotary coupling between the upper structure and its associated base is employed.

1 Claim, 5 Drawing Sheets

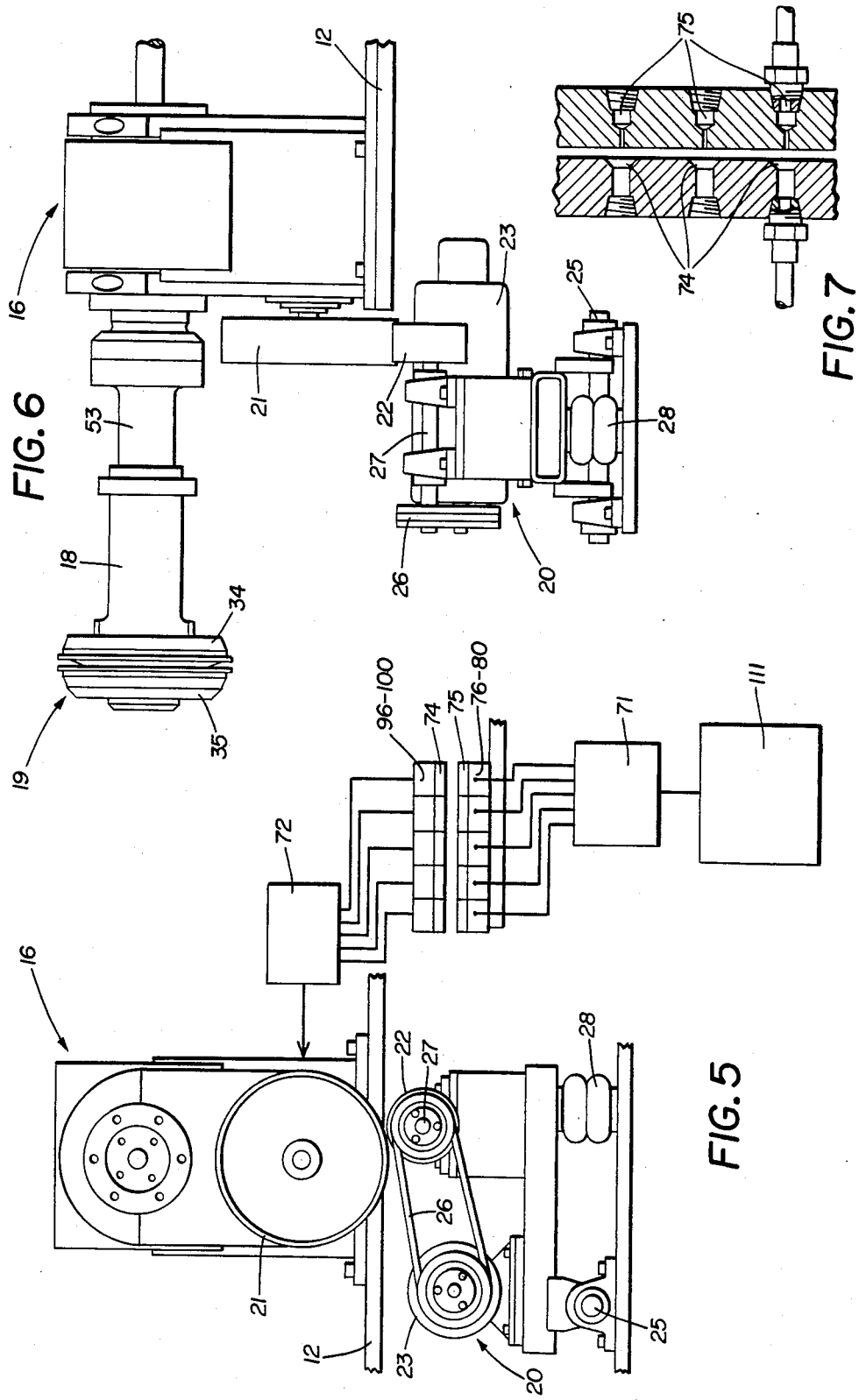

SHAPING TURRET

BACKGROUND OF THE INVENTION

I. Field of the Invention

This invention relates to shaping means employed in the fabrication of tires and more particularly to a shaping turret having a plurality of workstations adapted to perform various functions of the shaping operation. Specifically, the instant invention relates to a shaping turret employing an upper structure carrying a plurality of bladderless shaping drums or flanges which are driven and controlled by means requiring only one rotary coupling between the upper structure and its associated base.

II. Description of the Prior Art

Turret type machines are old in the art as exemplified by U.S. Pat. No. 2,618,982 to Mead which discloses a rotary work feeder which may be used for supporting in a desired position a plurality of different work pieces and for successively moving such work pieces into position for processing; U.S. Pat. No. 3,999,264 to Carmen which discloses a rotatable tool holding turret of the type adapted for use with a lathe or the like and U.S. Pat. No 4,285,259 to Jelinek, et al., which discloses a semi-automatic electro-mechanical arrangement for indexing turrets in a punching machine or the like.

Turret type machines have also been used in the fabrication of tires as exemplified by U.S. Pat. No. 3,223,573 to Deist which discloses a rotatable turret assembly, the turret carrying a rotatable mandrel which supports the tire carcass or body during application of the rubber material thereto; U.S. Pat. No. 3,775,220 to Rattray which discloses a means for mounting a plurality of bases on a central shaft and means for rotating the central shaft to advance the bases through a succession of stations for applying components to the bases; and U.S. Pat. No. 4,126,506 to Marosan which relates to a material handling apparatus programmed to selectively load a conveyor with tires in a sequence corresponding to the loading sequence required by a cluster of recapping machines.

The prior art utilizing a turret or similar arrangement to facilitate the transporting of drums between workstations includes U.S. Pat. No. 1,964,363 to Ostling, et al., which discloses an endless chain conveyor adapted to carry tire building drums and accessory mechanisms along a track and in a continuous motion, while operators apply material and perform certain manual operations thereon; U.S. Pat. No. 2,071,716 to Wikle which discloses an apparatus employing a continuous circular platform which carries tire building machines rather than having the machines mounted on separate bases; and U.S. Pat. No. 2,253,781 to Haase, et al., which shows a plurality of tire building machines arranged in a group, conveying means for supplying the operators at the machines with the proper material when required, and servicing means for supplying material to the conveyor and other servicing means for removing finished tires therefrom.

Although some of the art discussed above does disclose a turret type arrangement used in the construction of a tire, none of the above-noted art discloses a shaping turret having drums adapted to receive from a transfer mechanism the green tire carcass and tread assembly wherein the means for driving and controlling the rotatable upper structure of the turret is greatly simplified.

There is, therefore, a need for an apparatus which is readily adapted to receive green tire carcasses and tread assemblies from a transfer device and apply them to a drum in order to combine the two components and provide the final shaping of the tire. There is also a need for providing such an apparatus having a greatly simplified drive and a greatly simplified control means for the rotatable upper structure of the turret.

SUMMARY OF THE INVENTION

The present invention relates to a means and method for the final shaping of a tire and more particularly to a turret means having a plurality of bladderless shaping drums which are adapted to receive a green tire carcass and a tread assembly in order to combine the two components. The instant invention also provides means for providing the final shaping of the tire. The drive and control means for the bladderless shaping drums mounted upon the rotating upper structure of the turret are controlled by means requiring a minimum number of slip type connections from the fixed lower structure of the turret.

BRIEF DESCRIPTION OF THE DRAWINGS

FIG. 5 is a front view of the drive mechanism of the instant invention showing a schematic of the control circuitry employed.

FIG. 6 is a side view of the drive mechanism of the instant invention.

FIG. 7 is a detailed cross-sectional view of the source/nozzle units shown in FIG. 4 of the drawings.

DESCRIPTION OF AN EXEMPLARY EMBODIMENT

Figure 1:
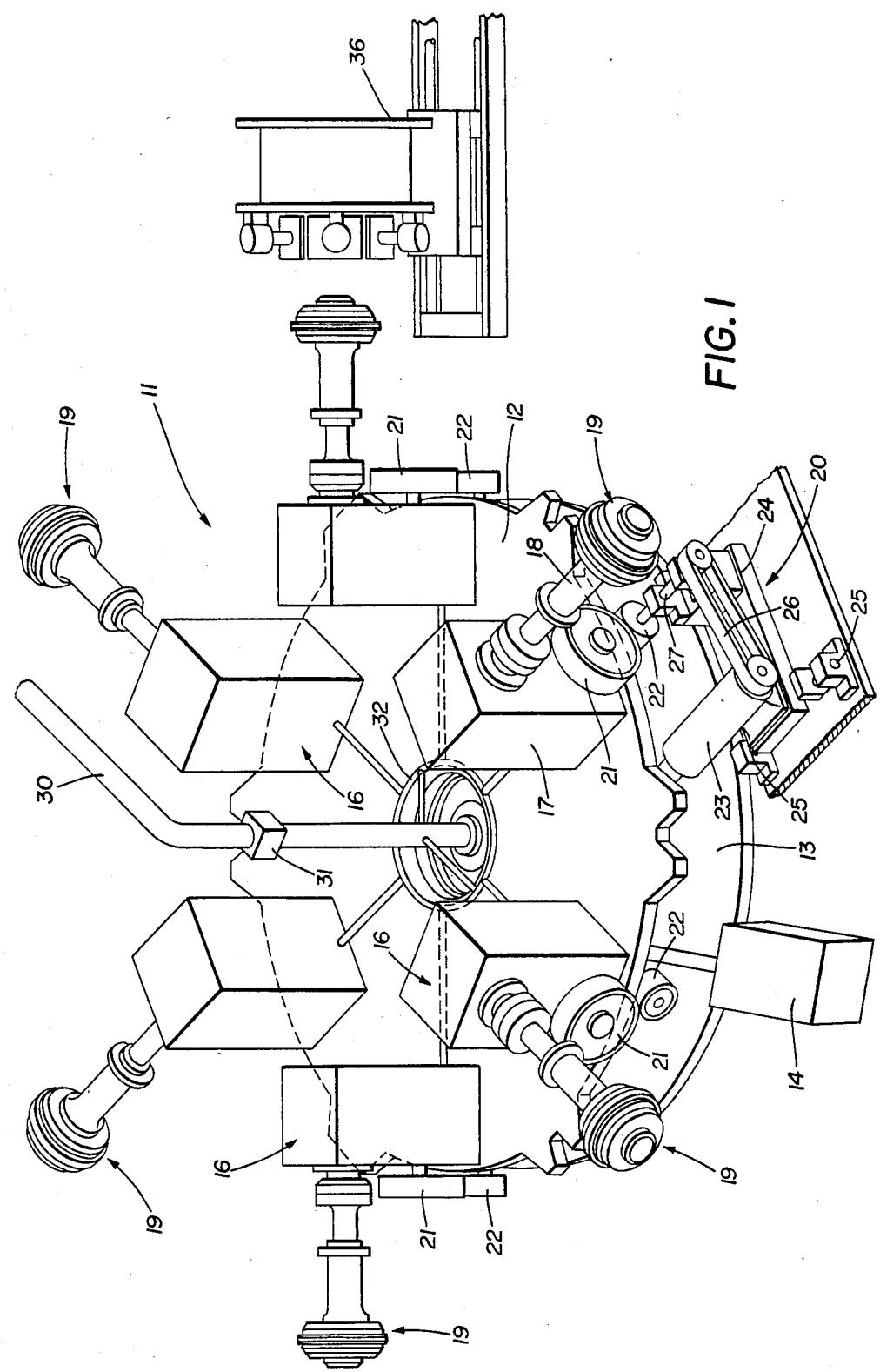
FIG. 1 is an overall perspective view of the instant invention.

Referring now to FIG. 1 of the drawings, there is disclosed a perspective view of the instant invention including shaping turret 11. The shaping turret 11 is generally comprised of an upper member 12 which is mounted on and rotatable with respect to base member 13. The upper member 12 is caused to rotate with respect to the base member 13 by means of turret drive 14 which drives a turret transmission disposed beneath the upper member 12 in order to impart rotary motion thereto. There is thus provided a means for indexing the upper member 12 with respect to the base member 13. In the exemplary embodiment the upper member 12 is indexed to six separate positions corresponding to workstations wherein six different operations are performed as disclosed more fully below.

Disposed on the upper member 12 are a plurality of bladderless shaping drum units 16. Each of the bladderless shaping drum units is comprised of a drive housing 17, an extension shaft 18, and a drum member 19 disposed on the outboard end of the extension shaft 18. In the exemplary embodiment six drums are equally disposed about the periphery of the upper member 12 and are spaced to coincide with the six workstations disposed about the upper member 12.

Associated with each of the workstations disposed about the upper member 12 is a drive unit 20. Each of the drive units 20 is comprised of a frame member 24 adapted to be pivoted about pivots 25. Disposed on the frame member 24 is drive motor 23 which engages by means of drive belt 26 jackshaft 27. Disposed on the end of the jackshaft 27 is friction wheel 22. In the exemplary embodiment the friction wheel 22 is preferably constructed with an elastomeric outer covering preferably of rubber or polyurethane. The friction wheel 22 is disposed proximate to drive wheel 21. The drive wheel 21 is associated with the drive housing of the bladderless shaping drum unit 16 and, as more fully disclosed below, drives the drum member 19 via a transmission contained within the drive housing 17.

It may now be appreciated that the friction wheel 22 may be caused to engage the drive wheel 21 by causing the frame member 24 to pivot about pivots 25 by means shown below. There is thus provided a means associated with each of the stationary workstations for driving the bladderless shaping drum units 16 disposed upon the rotatable upper member 12 and positioned at a workstation.

Air pressure is provided to the bladderless shaping drum units disposed on the upper member 12 by means of air supply line 30 which provides compressed air from a source of compressed air through slip coupling 31 to a manifold 32 which in turn distributes the compressed air to the bladderless shaping drum units 16.

The air pressure provided by the air supply line through slip coupling 31 also provides a means for controlling the bladderless shaping drum units as more fully disclosed below. There is thus provided a means for driving and controlling the bladderless shaping drum units disposed on the rotatable upper member 12 wherein only a single slip coupling is required to provide the necessary power to the upper member 12.

Figure 2:
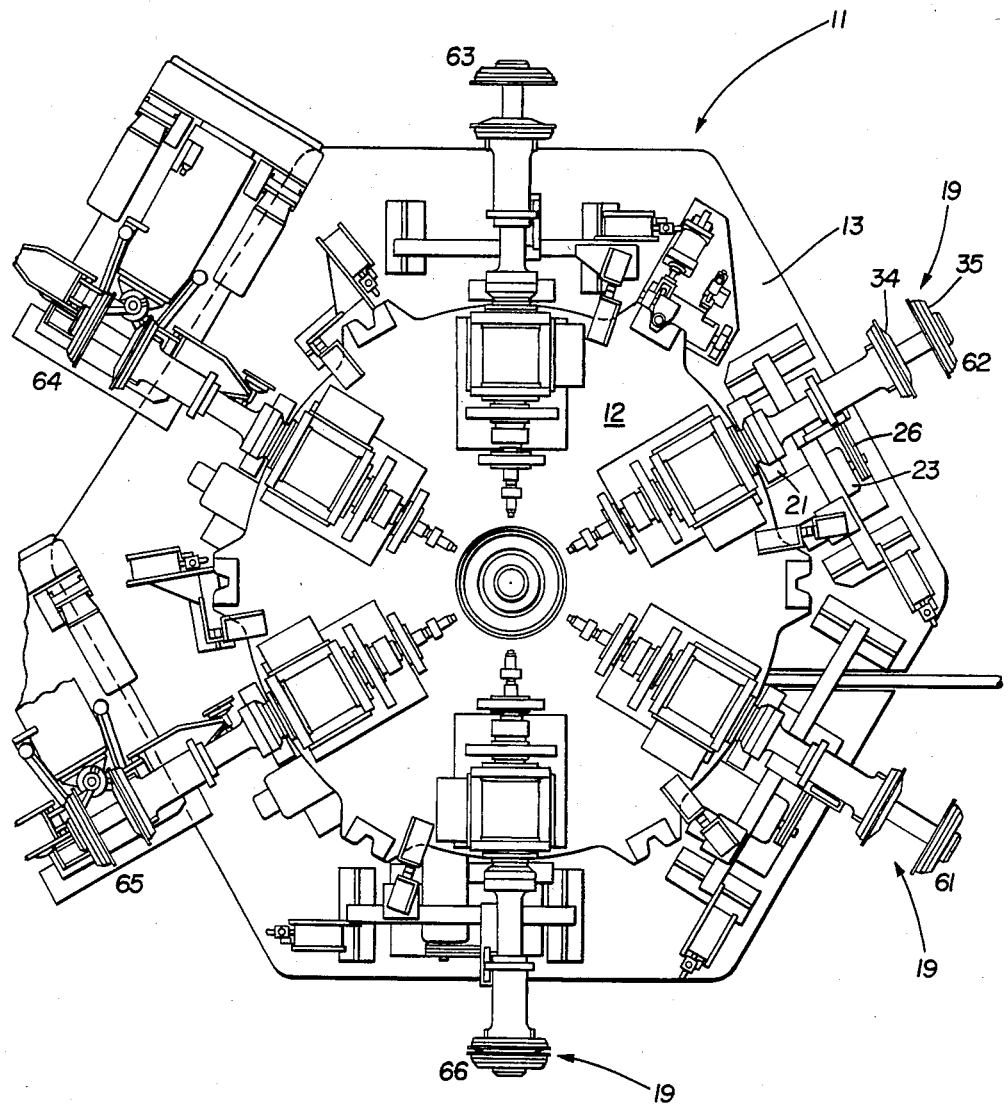
FIG. 2 is an overall plan view of the instant invention.

FIG. 2 of the drawings discloses a detailed plan view of the shaping turret 11. The six workstations of the shaping turret 11 are designated 61 through 66. The first stage green tire is loaded onto the drum member 19 at workstation 61. In the exemplary embodiment, the green tire is loaded onto the drum member 19 by means of a tire gripper such as that disclosed in U.S. patent application Ser. No. 424,811 to Lauber, which application is hereby incorporated by reference. It should be noted that the drum member 19 is comprised of two bead mounting members 34 and 35 which may be longitudinally displaced with respect to one another by means more fully disclosed below. When the green tire is initially placed on the drum member 19 the bead mounting members 34 and 35 are located proximate to each other as shown in workstation 66. After the green tire has been mounted on the drum member 19 by the tire gripper, the bead mounting members 34 and 35 are longitudinally displaced with respect to each other as shown by the position of the bead mounting members at workstation 61.

The upper member 12 is then indexed to cause the green tire mounted on the drum member 19 to be transferred to workstation 62 where the green tire is inspected.

After the green tire has been inspected at workstation 62, the upper member 12 is again indexed to cause the green tire and its associated drum member 19 to be transferred to workstation 63 where a tread assembly is placed over the green tire and the green tire is inflated to cause the tread assembly to be transferred from a tread assembly transfer device 36 (shown in FIG. 1) to the green tire.

After this operation has been completed the upper member 12 is again indexed to cause the green tire and its associated drum member to be transferred to workstation 64 where a portion of the tread assembly is stitched to the green tire. After this portion of the stitching is completed the upper member 12 is again indexed to cause the green tire with its associated tread mounted on the drum member 19 to be transferred to workstation 65 where the remainder of the tread is stitched to the green tire carcass.

After this stitching operation has been completed the upper member 12 is again indexed to workstation 66 where the bead mounting members are caused to assume a position proximate to one another and the tire is removed from the drum member 19. The green tire thus produced is then ready for vulcanization.

It will be appreciated by one skilled in the art that a green tire carcass will be loaded on a bladderless shaping drum each time it is indexed thereby producing a completed tire each time the upper member 12 is indexed.

Figure 3:
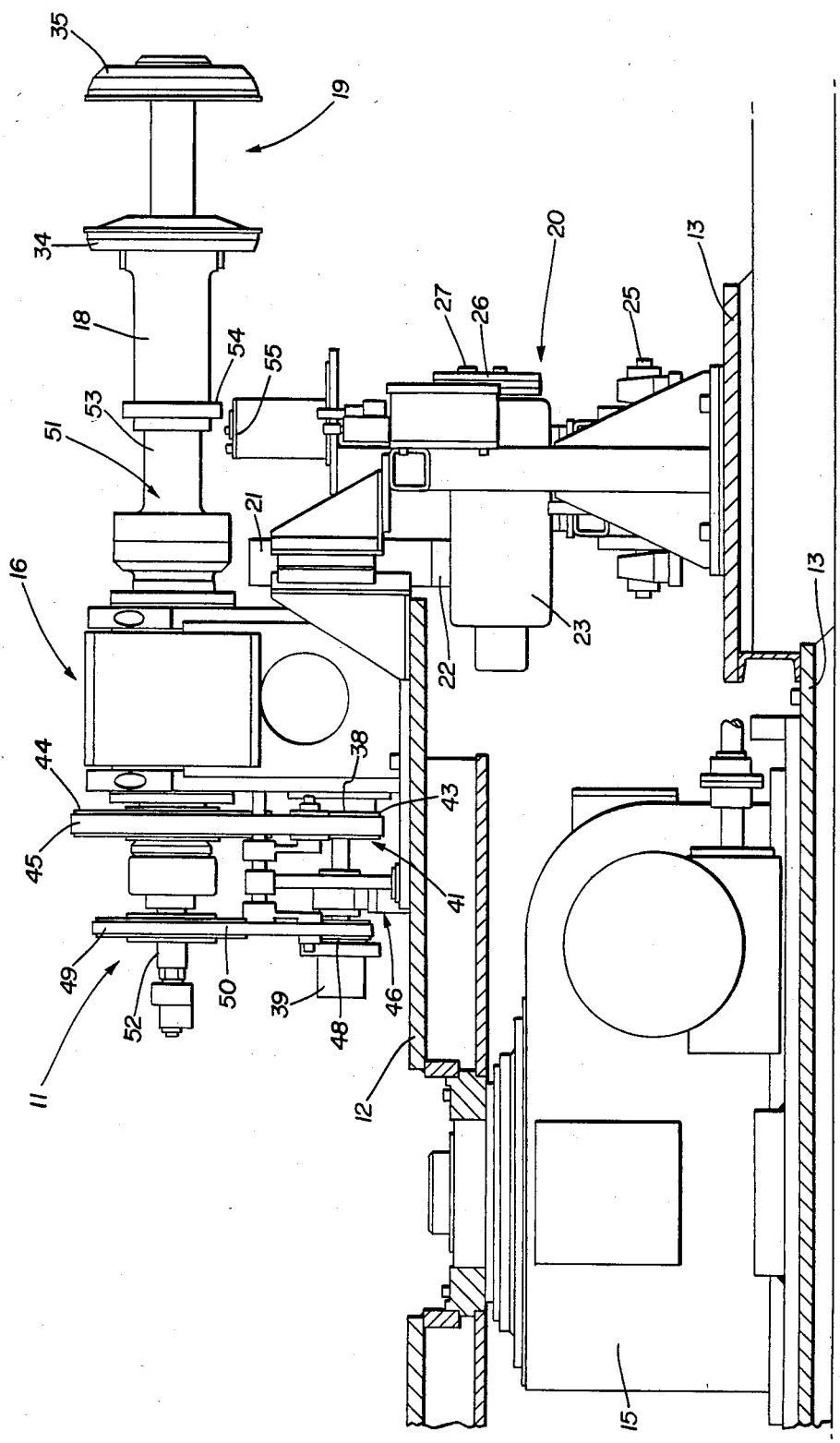
FIG. 3 is a side view showing details of construction of the instant invention.

Referring now to FIG. 3 of the drawings, there is shown a cross-sectional view of the shaping turret 11 disclosing the details of construction thereof. Specifically, there is shown the upper member 12 mounted on the turret transmission 15 which in turn is mounted on the base member 13. The bladderless shaping drum unit 16 is mounted on the upper member 12.

The bladderless shaping drum unit is comprised essentially of two main shaft units. The lower shaft unit 41 has one end thereof fixedly attached to the drive wheel 21. The lower shaft unit 41 has one end thereof affixed via clutch means 38 to drive pulley 43 which engages upper drive pulley 44 by means of drive belt 45. Also affixed to the lower drive shaft unit 41 is brake assembly 46 (shown in FIG. 4). Near the end of the lower shaft unit 41 opposite the drive wheel 21 is drive pulley 48 which is mounted via clutch means 39 on shaft unit 41 and which engages upper drive pulley 49 by means of drive belt 50. There is thus provided a means whereby the lower shaft unit 41 engages drive pulley 43 via clutch means 38 and the lower shaft unit 41 drives the drive pulley 48 via clutch means 39. During normal operation the clutch means 38 and 39 are engaged thereby causing drive pulleys 43 and 48 to rotate together. However, when the brake assembly 46 is energized and the clutch means 38 is disengaged, thereby effectively stopping the drive pully 43, the drive pulley 48 is still free to turn thereby providing a means for selectively driving the drive pulleys 43 and 48.

The upper shaft unit 51 is comprised of an inner drive shaft 52 and an outer drive shaft 53. The inner drive shaft is driven via upper drive pulley 49 while the outer drive shaft 53 is driven by upper drive pulley 44. During normal operation, the drive pulleys 44 and 49 are rotated together thereby causing the inner and outer portions of the upper shaft unit 51 to rotate. However, when it is desired to displace the bead mounting members 34 and 35 with respect to each other, the drive pulley 49 may be driven while maintaining the upper drive pulley 44 stationary in order to cause such displacement. This displacement is effected by a threading relationship between the inner drive shaft 52 and the outer drive shaft 53. Affixed to the inner drive shaft 52 is bead mounting member 35. Similarly, bead member 34 is fixedly attached to the outer drive shaft 53. The inner drive shaft 52 threadily engages the outer drive shaft 53 such that when the inner drive shaft 52 is rotated relative to the outer drive shaft 53 the bead mounting members are displaced longitudinally with respect to each other.

Position control of bead members 34 and 35 is accomplished by the use of a shaping drum mounted sensing ring 54 and floor mounted proximity switches 55 (see FIG. 3.). As the drum flange unit 34 is positioned axially, sensing ring 54 is likewise positioned. Floor mounted proximity switches 55 are positioned so as to be actuated by the sensing ring 54. Adequate proximity switches are suitably mounted at each workstation so as to provide proper shaping flange position control for that workstation.

There is thus provided a means for selectively causing a rotation of the drum member 19 and further a means for selectively displacing the bead mounting members 34 and 35 with respect to each other.

Figure 4:
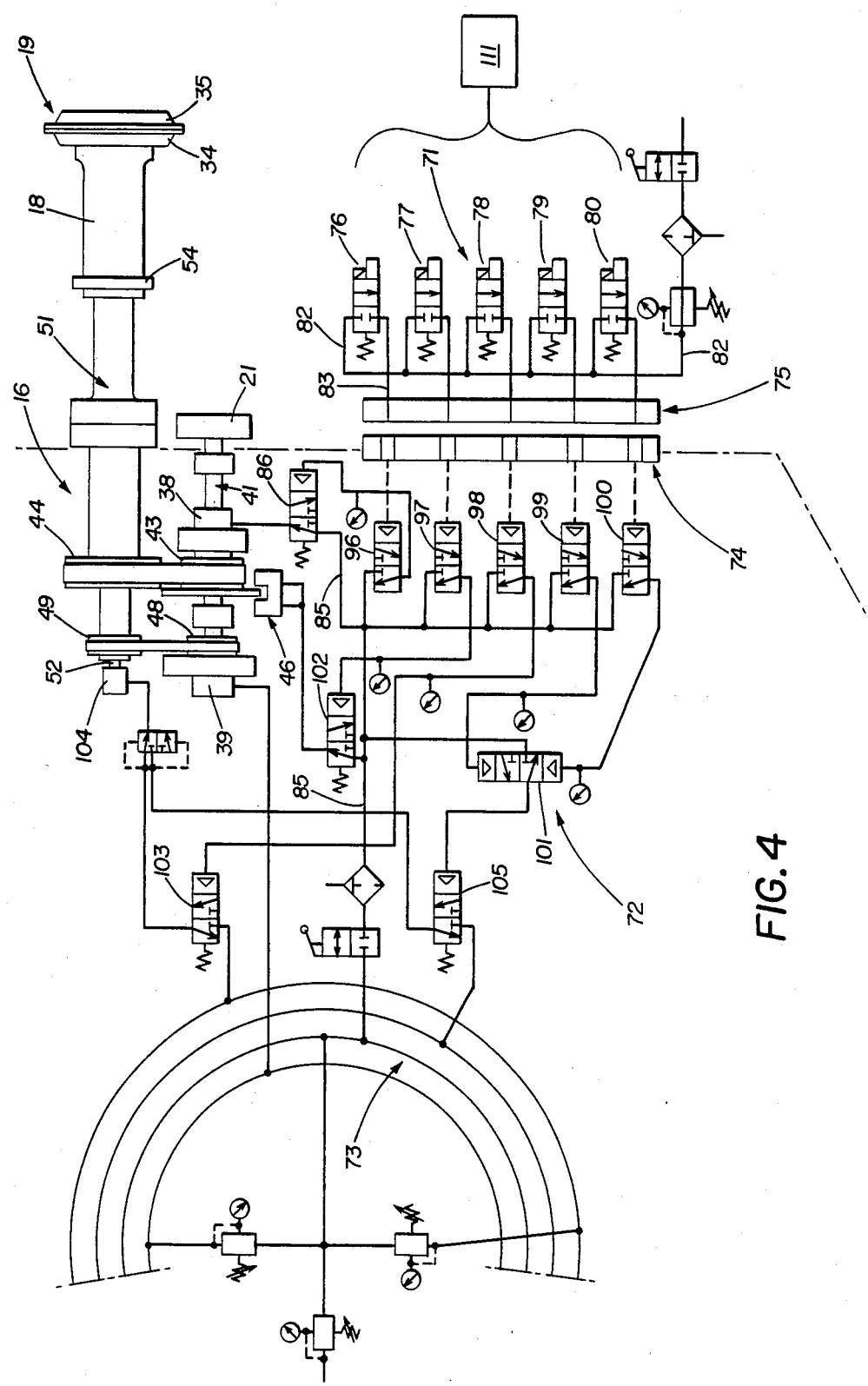
FIG. 4 is a schematic representation of the pneumatic circuitry employed by the instant invention.

Referring now to FIG. 4 of the drawings, there is disclosed a schematic diagram of the circuitry employed to power and control the bladderless shaping drum units 16 utilized in the instant invention. The circuitry in general is comprised of the input circuitry 71 associated with the fixed base 13 which is provided signals by a logic controller in order to cause the shaping turret 11 to perform the desired operations. There is also disclosed control circuitry 72 associated with the bladderless shaping drum unit 16 which is provided air from distribution circuitry 73. It should be noted that communication between the input circuitry 71 and the control circuitry 72 is effected by interface 74 and 75. In the exemplary embodiment, interface 74 and 75 are comprised of air source/detection means more fully described below.

The source/detection means consists of source units 75 adjacent to funnel shaped detector units 74. Funnel shaped detector units are used to reduce the necessity of precise alignment between source/detector units. A sectional view of source/detector units is shown in FIG. 7.

Source units 75 are connected to a plurality of solenoid-operated air valves 76 through 80 (see FIG. 4.). Each of the solenoid-operated air valves 76 through 80 is operatively connected to a programmable controller 111.

The detector units 74 are connected to the signal pressure inputs of conventional fluidic amplifier valves 96 through 100. These valves are designed to operate on very low pilot pressures (5 to 10 inches water column). In the exemplary embodiment the amplifier valves 96 through 100 are Clippard Minimatic Model No. 2300 units manufactured by the Clippard Instrument Laboratory of Cincinnati, Ohio.

In normal operation, source units 75 are held adjacent detector units 74, but no physical contact is made. Normal distance between source/detector units is 0.10 inches to 0.25 inches. In this configuration, source pressures from 6 to 10 PSIG produce detector pressures of appoximately 10 inches water column which is adequate to operate amplifier valves 96 through 100.

As stated before, input circuitry 71 is comprised of a plurality of solenoid-operated air valves 76 through 80. Each of these air valves is operatively connected to a programmable controller 111. In the exemplary embodimett, the programmable controller 111 is a Model No. 4001 Director Programmable Controller manufactured by the Struthers-Dunn Company of Bettendorf, Iowa. The programmable controller 111 is programmed in order to cause a selective actuation of solenoid-operated air valves 76 through 80 in order to provide a controller function of the bladderless shaping drum units 16 in accordance with the mode of operation described above and by means more fully described below.

The solenoid-operated air valve 76 is provided with a source of compressed air from supply line 82. Upon actuation of the valve 76, the air pressure provided on air supply line 82 is ported to output line 83. The end of the output line 83 is positioned proximate to the input of pilot-operated valve 96. It should be appreciated that there is no physical connection between the output line 83 and the input signal port of the amplifier valve 96.

In its initial position the amplifier valve 96 does not allow the passage of compressed air therethrough. However, upon actuation of the solenoid-actuated control valve 76, the amplifier valve 96 is caused to port compressed air from supply line 85 to pilot actuated valve 86 thereby causing an actuation of the valve 86 thereby disconnecting the source of air provided on supply line 85 from the clutch unit 38 thereby disengaging the drive pulley 43 from the lower shaft unit 41.

Similarly, it may be appreciated that an actuation of the solenoid-operated control valve 77 will cause an actuation of valve 102 thereby causing the brake assembly 46 to disengage allowing drive pulley 43 to rotate.

Actuation of solenoid-operated valve 79 causes an actuation of pilot operated mechanically detented valve 101. This valve shifts causing air pressure to be ported to pilot operated valve 105. Valve 105 provides low pressure air to rotary coupling 104 which supplies low air pressure to drum member 19 in order to allow the green tire carcass to be inflated thereon. It can also be seen that after deactuation of solenoid-operated valve 79 valve 101 stays in position being held by mechanical detent.

Actuation of solenoid-operated valve 80 causes an actuation of pilot operated mechanically detented valve 101. This valve now shifts removing air pressure from pilot operated valve 105 which removes low pressure air from drum member 19.

It can be seen that solenoid-operated valves 79 and 80 described above, respectively, cause low pressure air to be turned on and off from drum member 19. Low pressure air when turned on remains on irregardless of relative motion between upper unit 12 and its base.

Actuation of solenoid-operated control valve 78 causes a similar actuation of pilot-operated control valve 103 which provides high air pressure to rotary coupling 104 which supplies high air pressure to the drum member 19 in order to allow the green tire carcass to be inflated thereon at a higher pressure than that provided by valve 105.

There is thus provided a means for controlling the bladderless shaping drum units 16 disposed on upper member 12 by means of interface 74 and 75 which utilize air stream output from input circuitry 71 to energize control circuitry 72 to provide a transfer of logic information from the stationary base member 13 to the upper member 12.

Referring now to FIG. 5 of the drawings, there is shown a bladderless shaping drum unit 16 mounted on upper member 12 showing its positional relationship with respect to drive unit 20 which is comprised of a drive motor 23 driving jackshaft 27 via drive belt 26 which jackshaft 27 in turn drives friction wheel 22 which may selectively be engaged with drive wheel 21.

The drive motor 23 and the jackshaft 27 are mounted on a base which may be pivoted about pivots 25 by means of air spring 28 which may be selectively expanded in order to pivot the drive unit into and out of engagement with the drive wheel 21.

Also shown in FIG. 5 schematically is the control circuit employed by the instant invention. Specifically, there is shown a programmable controller 111. The programmable controller 111 provides control signals to input circuitry 71 which in turn controls the output of the solenoid-operated air valves 76-80, which output is utilized as an input signal to the pilot actuated control valves 96-100 which in turn provide logic information to the control circuitry 72 which governs the operation of the bladderless shaping drum unit 16.

FIG. 6 is a right-side view of the apparatus shown in FIG. 5 with the exception of the schematic of the control circuitry.

There is thus provided a means for providing logic signals and a driving means between a rotating upper member and a fixed base whereby the number of slip couplings required to transmit the logic signals and the driving means is kept to a minimum.

It will be apparent to those skilled in the art that various modifications and additions may be made in the instant invention without departing from the essential features thereof, which are intended to be defined and secured by the appended claims.

What is claimed is:

1. An apparatus for shaping a tire, comprising:
   (a) turret means adapted to be rotated about an index axis;
   (b) a plurality of drive units affixed to said turret means and adapted to be rotated therewith about said index axis and positioned at a plurality of workstations about said turret means having control means associated with at least one of said drive units which is responsive to the workstation at which said drive unit is positioned, wherein a drive member is associated with at least one of said drive units which frictionally engages a drive member at the workstation at which said drive unit is positioned;
   (c) tire retaining means associated with said drive units; and
   (d) loading means for placing a tire on one of said tire retaining means at one of said workstations.

* * * * *